UNITED STATES PATENT OFFICE.

PAUL CAUBET, OF PARIS, FRANCE.

IMPROVED COMPOSITION FOR PAINT.

Specification forming part of Letters Patent No. 39,020, dated June 23, 1863.

*To all whom it may concern:*

Be it known that I, PAUL CAUBET, of Paris, in the French Empire, have invented a certain new and useful composition, called "Neoline," for painting; and I hereby declare that the following is a full, clear, and exact description of the same.

The composition subject-matter of this patent, called, "neoline," is made by mixing two compounds, each prepared as hereinafter described and incorporated at the time of using.

First or liquid compound.

| | |
|---|---|
| Distilled water | 750 parts. |
| Oxalic acid | 65 " |
| Sugar, sirup, or other saccharine matter | 60 " |
| Alkali in salts or liquid—say salts of tartar, soda, potash, ammonia, or other alkali—modifying the proportion according to the strength of the material used | 100 " |
| Soft soap | 25 " |
| | 1,000 parts. |

Preparation: Dissolve the alkali and the sugar in the distilled water, add alkali, and agitate until perfect solution. Withdraw about one-tenth of the solution and dissolve the soap in it. Then add this to the first solution, agitate, allow to settle, and filter.

Second or siccative compound.

| | |
|---|---|
| White lead, zinc, or white with barytes for its base, or chalk | 125 parts. |
| Boiled drying-oil | 125 " |
| Liquid siccative of any kind | 250 " |
| White petrific siccative in powder, preferably that which is known in France under the commercial name of "zumatique" | 250 " |
| Soft soap, (by preference mixed with silicate of potash or soda,) | 200 " |
| Litharge | 50 " |
| | 1,000 parts. |

Instead of employing the soft soap pure, I prefer to mix with it about six per cent. of silicate of soda or potash in order to give it greater hardness and dryness. The soft soap thus silicated is introduced in small quantities in the preparation of the siccative compound.

Preparation: Grind down the chalk with the liquid siccative, add and mix the zumatic and the litharge with the boiled drying-oil, and gradually the soap. Beat the whole until a homogeneous paste results. This paste will be of a yellowish color. Where desired, in order to get the paste of a whiter color, the litharge may be dispensed with and a greater proportion of zumatic may be used. Again, to obtain the paste quite white, both litharge and zumatic may be dispensed with and an additional quantity of white lead and soft soap may be used.

This second compound is incorporated with the first at the time of using the paint, in the proportion of about one part of the siccative to nine parts of the liquid compound; or the compounds may be mixed and sold as one composition.

This composition is applicable to all colors ground down or mixed with oil, and forms an excellent paint very easily applied. As a paint it presents all the qualities of the best oil-paint heretofore in use, and, furthermore, presents the advantage of being produced at a much cheaper rate, while it is free from unpleasant odor and other emanations injurious to the health of painters.

In order to give increased brilliancy to the color as a paint, it ought to be prepared with about twenty per centum of oil.

And having now described the nature of my invention and in what manner the same is to be performed, I declare that I do not limit myself to the exact proportions hereinbefore given of the constituent parts of the improved composition, and that I claim—

The improved composition for painting, composed of two compounds or preparations, one a liquid and the other a siccative compound, to be combined in the proportion and the manner substantially as hereinbefore described.

In testimony whereof I have signed my name to this specification before two subscribing witnesses.

P. CAUBET.

Witnesses:
E. SHERMAN GOULD,
F. JANNIE.